United States Patent [19]

Nesheiwat et al.

[11] Patent Number: 4,730,034

[45] Date of Patent: Mar. 8, 1988

[54] RECOVERING POLY(ARYLENE SULFIDE) OLIGOMERS FROM A POLY(ARYLENE SULFIDE) REACTION MIXTURE

[75] Inventors: Afif M. Nesheiwat, Bartlesville, Okla.; Guy Senatore, Borger, Tex.; Fred T. Sherk, Tokyo, Japan

[73] Assignee: Phillips Petroleum Company, Bartlesville, Okla.

[21] Appl. No.: 6,410

[22] Filed: Jan. 23, 1987

[51] Int. Cl.⁴ ............................................. C08G 75/14
[52] U.S. Cl. ................................... 528/388; 528/491; 528/494; 528/495; 528/498; 528/499
[58] Field of Search ............... 528/388, 491, 494, 495, 528/498, 499

[56] References Cited

U.S. PATENT DOCUMENTS

| | | | |
|---|---|---|---|
| 3,396,110 | 8/1968 | Hill, Jr. et al. | 252/42.1 |
| 3,786,035 | 1/1974 | Scoggin | 260/79.1 |
| 4,025,496 | 5/1977 | Anderson et al. | 260/79.1 |
| 4,046,749 | 9/1977 | Hawkins | 260/79 |
| 4,415,729 | 11/1983 | Scoggins et al. | 528/388 |
| 4,524,200 | 6/1985 | Sherk et al. | 528/388 |

*Primary Examiner*—Harold D. Anderson
*Attorney, Agent, or Firm*—J. D. Brown

[57] ABSTRACT

Poly(arylene sulfide) oligomers are recovered in a process comprising steps of:
(a) dehydration of an aqueous admixture of alkali metal hydroxide such as sodium hydroxide, and alkali metal bisulfide such as sodium bisulfide, in a polar organic solvent such as N-methyl-2-pyrrolidone (NMP), wherein the molar ratio of alkali metal hydroxide to alkali metal bisulfide is about 0.90:1 to about 1.05:1 prior to dehydration and 0.99:1 to about 1.05:1 after dehydration;
(b) reaction of at least one polyhalo-substituted aromatic compound such as p-dichlorobenzene with the mixture from step (a) under polymerization conditions to produce a reaction mixture;
(c) addition of a phase separation agent such as water, to the reaction mixture to produce a phase-separated poly(arylene sulfide) mixture;
(d) cooling the mixture from step (c) to produce a slurry of particulate poly(arylene sulfide) and poly(arylene sulfide) oligomers in a liquid;
(e) separating particulate poly(arylene sulfide) from the slurry of step (d) leaving a dispersion of poly(arylene sulfide) oligomers in a liquid; and
(f) filtering the dispersion of step (e) to recover the poly(arylene sulfide) oligomers therefrom.

24 Claims, No Drawings

RECOVERING POLY(ARYLENE SULFIDE) OLIGOMERS FROM A POLY(ARYLENE SULFIDE) REACTION MIXTURE

FIELD OF THE INVENTION

This invention relates to processes for the production of polymers from aromatic compounds. In one aspect, this invention relates to processes for the production of arylene sulfide polymers. In another aspect, the invention relates to the separation of solid and liquid components of the reaction mixture of the reaction of polyhalo-substituted aromatic compounds in a polar organic solvent to provide poly(arylene sulfide). In still another aspect, it relates to the recovery of poly(arylene sulfide) oligomers by separation from the other components of its reaction mixture.

BACKGROUND OF THE INVENTION

U.S. Pat. Nos. 4,415,729 and 4,524,200 disclose a "water quench" method of separating and recovering particulate poly(arylene sulfide) from reaction mixtures wherein polyhalo-substituted aromatic compounds have been converted in the presence of a polar organic solvent. These patents also disclose that a poly(arylene sulfide) oligomer fraction is present in the reaction mixtures and can be separated from said particulate poly(arylene sulfide). The reference in the above patents to the oligomer fraction as "slime" and its indicated fine particle size ("fines") reveals the difficulties previously encountered in handling these poly(arylene sulfide) oligomers. In fact, the above patents disclose the recovery of said oligomers on filters coated with a filter aid and the subsequent discarding of the mixture of filter aid and poly(arylene sulfide) oligomers scraped periodically from the filters. It will be recognized that it would be desireable to reduce the relative amount of the oligomer fraction in the poly(arylene sulfide) reaction product if for no other reason than to reduce the magnitude of the separation operation. It will also be apparent that discarding the poly(arylene sulfide) oligomers represents an economic penalty because expensive reactants have been consumed in the formation of these polymeric products. Furthermore, it is known that poly(phenylene sulfide) oligomers, if recovered, can be cured to useful products (U.S. Pat. No. 4,046,749).

It is therefore an object of this invention to provide a method for reducing the amount of poly(arylene sulfide) oligomers generally obtained in the "water quench" method of separation and recovery of poly(arylene sulfide).

It is another object of this invention to provide a method for separating the reaction mixture of the reaction of polyhalo-substituted aromatic compounds and polar organic solvent which has produced poly(arylene sulfide) into poly(arylene sulfide) oligomers and other components that can be separated for recovery or disposal. It is another object of this invention to provide a method for improving the filterability of poly(arylene sulfide) oligomers obtained in the "water quench" method of separation and recovery of poly(arylene sulfide). It is yet another object of this invention to provide a method for recovery of poly(arylene sulfide) oligomers in a form which is easily treatable by further processing to give useful products.

STATEMENT OF THE INVENTION

In accordance with this invention a method is provided for recovering poly(arylene sulfide) oligomers which comprises the steps of:

(a) dehydrating an aqueous admixture of alkali metal hydroxide and alkali metal bisulfide in a polar organic solvent wherein the molar ratio of alkali metal hydroxide to alkali metal bisulfide in the aqueous admixture prior to dehydration is about 0.90:1 to about 1.05:1 and after dehydration is 0.99:1 to about 1.05:1;

(b) admixing at least one polyhalo-substituted aromatic compound with the dehydrated admixture of step (a) in an amount (ratio) to the bisulfide employed sufficient to form a polymerization reactant mixture;

(c) subjecting said reactant mixture of step (b) to polymerization conditions effective to produce a polymerization reaction mixture comprising poly(arylene sulfide);

(d) admixing said polymerization reaction mixture of step (c) at a temperature above that at which said poly(arylene sulfide) is in a molten phase with a sufficient amount of separation agent characterized as substantially soluble in said polar organic solvent and non-solvent for said poly(arylene sulfide) to effect a phase separation of said molten poly(arylene sulfide) from said polar organic solvent;

(e) cooling said polymerization reaction mixture from step (d) to produce a slurry comprising particulate poly(arylene sulfide) and poly(arylene sulfide) oligomers in a liquid comprising said polar organic solvent and separation agent;

(f) treating said slurry of step (e) to recover particulate poly(arylene sulfide) therefrom and produce a dispersion of poly(arylene sulfide) oligomers in a liquid; and (g) filtering said dispersion of poly(arylene sulfide) oligomers from step (f) to recover said oligomers therefrom.

It was surprising that very simple reactant ratio control in step (a) described above could have a pronounced effect on the poly(arylene sulfide) oligomer fraction obtained in the process of this invention both in terms of a reduction of the amount formed and in terms of easier recoverability.

Although water is the preferred separation agent employed in step (d) of the process of this invention (hence the term "water quench" process), any liquid can be used that is characterized as substantially soluble in the polar organic solvent used in the reaction mixture, that is a non-solvent for poly(arylene sulfide), and that has boiling characteristics suitable for the reaction and recovery conditions of this process. In general, paraffinic hydrocarbons, higher boiling alcohols, and higher boiling ethers are suitable compounds for use alone or in mixtures thereof. Examples of suitable compounds include kerosene, 1-hexanol, 1-octanol, anisole, and phenyl ether.

The polar organic solvents useful in the present invention are solvents for the polyhalo-substituted aromatic compounds used in the production of arylene sulfide polymers. Examples of such polar organic solvents include amides, (including lactams,) and sulfones. Specific examples of such polar organic solvents include hexamethylphosphoramide, tetramethylurea, N,N'-dimethylethyleneurea, N,N'-ethylenedipyrrolidone, N-methyl-2-pyrrolidone (NMP), pyrrolidone, caprolactam, N-ethylcaprolactam, sulfolane, N,N'- dimethylacetamide, low molecular weight polyamides, and the like. The polar organic solvent presently preferred is N-methyl-2-pyrrolidone (NMP).

Alkali metal bisulfides which can be employed in the process of this invention include lithium bisulfide, sodium bisulfide, potassium bisulfide, rubidium bisulfide, cesium bisulfide, and mixtures thereof.

The alkali metal bisulfide usually is employed in hydrated form and/or as an aqueous mixture, preferably in the liquid state at the temperature of use. Although the water present with the alkali metal bisulfide can vary over a considerable range, generally the water will be present, as water of hydration and/or as free water, in an amount within the range of about 20 to about 60 weight percent, preferably about 25 to about 40 weight percent, based on the total weight of alkali metal bisulfide plus water associated therewith.

Alkali metal hydroxides which can be employed in the process of this invention include lithium hydroxide, sodium hydroxide, potassium hydroxide, rubidium hydroxide, cesium hydroxide, and mixtures thereof.

Although the alkali metal hydroxide can be employed in anhydrous form, preferably it is employed in hydrated form and/or as an aqueous mixture, more preferably in the liquid state at the temperature of use. Although the water present with the alkali metal hydroxide can vary over a considerably range, generally the water will be present, as water of hydration and/or as free water, in an amount up to about 70 weight percent, preferably about 25 to about 60 weight percent, based on the total weight of alkali metal hydroxide plus water associated therewith.

In the production of arylene sulfide polymers by the process of this invention, the alkali metal hydroxide is usually mixed with an aqueous mixture comprising the alkali metal bisulfide and the polar organic solvent, e.g. NMP. After addition of the alkali metal hydroxide substantially all of the water is removed by a distillation procedure to provide a dehydrated composition derived from alkali metal hydroxide, alkali metal bisulfide and polar organic solvent.

It has been found that by employing a molar ratio of alkali metal hydroxide to alkali metal bisulfide in the aqueous admixture to be dehydrated of about 0.90:1 to about 1.05:1 and in the dehydrated admixture a molar ratio of 0.99:1 to about 1.05:1, the amount of poly(arylene sulfide) oligomer is reduced and said oligomer fraction is more easily recovered than when molar ratios not fitting the above conditions are employed.

As used herein the term polyhalo-substituted aromatic compound is intended to encompass reactive polyhalo aromatic compounds having 2 to 6 halogen substituents per molecule. However, in general, arylene sulfide polymers (including oligomers) made according to the process of this invention are phenylene sulfide polymers produced by the steps outlined above. Often, optional reaction mixture components such as a minor amount of a polyhalo aromatic compound having more than two halogen substituents per molecule, and/or a polymerization modifying compound such as an alkali metal carboxylate or a lithium halide, can be employed with beneficial results. Some of the more common components of these reaction mixtures are listed below:

p-Dihalobenzenes which can be employed by the process of this invention can be represented by the formula

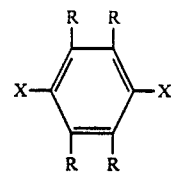

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene, and the like and mixtures thereof.

Polyhalo aromatic compounds having more than two halogen substituents per molecule which can be employed in the process of this invention can be represented by the formula $R'X'_n$ where each $X'$ is selected from the group consisting of chlorine and bromine, preferably chlorine, n is an integer of 3 to 6, and $R'$ is a polyvalent aromatic radical of valence n which can have up to about 4 methyl substituents, the total number of carbon atoms in $R'$ being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Alkali metal carboxylates which can be employed in the process of this invention can be represented by the formula $R''CO_2M$, where $R''$ is a hydrocarbyl radical selected from alkyl, cycloalkyl, and aryl, and combinations thereof such as alkaryl, aralkyl, and the like, the number of carbon atoms in said $R''$ being within the range of 1 to about 20, and M is an alkali metal selected from lithium, sodium, potassium, rubidium, and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octanoate, sodium heneicosanoate, lithium cyclohexanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The amount of alkali metal carboxylate generally used as a polymerization modifier in the polymerization reaction usually about 0.05 to about 4, preferably about 0.1 to about 2 gram-moles carboxylate/gram-mole of p-dihalobenzene will serve to reduce the amount of separating agent needed.

Lithium halides which can be employed in the process of this invention include lithium chloride, lithium bromide, lithium iodide, and mixtures thereof.

According to the process of this invention in step (b) above at least one polyhalo-substituted aromatic compound with or without additional polar organic solvent and one or more of the optional reaction mixture components given above, is admixed with the dehydrated composition from step (a). Although the molar ratio of total polyhalo-substituted aromatic compound(s) to alkali metal bisulfide can vary, it will generally be within the range of about 0.99:1 to about 1.2:1, preferably about 1:1 to about 1.1:1. It is also preferred that this ratio will be greater than the molar ratio of alkali metal hydroxide to alkali metal bisulfide in the aqueous admixture of step (a).

The amount of polar organic solvent employed in the polymerization reaction mixture can vary considerably. Generally, the molar ratio of polar organic solvent to alkali metal bisulfide will be within the range of about 1:1 to about 10:1, preferably within the range of about 2:1 to about 5:1.

Although the reaction temperature at which the polymerization is conducted can vary over a wide range, generally it will be within the range of about 150° C. to about 400° C., preferably about 200° C. to about 300° C. The reaction time can vary widely depending in part on the reaction temperature, but generally will be within the range of about 10 minutes to 72 hours, preferably about 1 hour to about 8 hours. The pressure should be sufficient to maintain the polyhalo-substituted aromatic compound and the polar organic solvent substantially in the liquid phase.

Polymerization of various components set out above result in a reaction mixture at a temperature above that at which poly(arylene sulfide) is in molten phase comprising poly(arylene sulfide), polar organic diluent, arylene sulfide oligomers ("slime"), sodium chloride, and unreacted reactants as the major components of the reaction mixture. For commercial purposes, currently most usually, the poly(arylene sulfide) would be poly(phenylene sulfide) (PPS) and the polar organic solvent would be N-methyl-2-pyrrolidone (NMP).

In those reaction mixtures that are anhydrous or that contain relatively little separation agent, usually water, the addition of separation agent, preferably deionized water, will cause a phase separation between the molten poly(arylene sulfide) and the polar organic solvent. In the preparation of poly(arylene sulfide) using alkali metal-carboxylate sufficient separation agent can be present in the reaction mixture to cause the phase separation between molten poly(arylene sulfide) and polar organic solvent, but the addition of separation agent, preferably deionized water, to this mixture can enhance the separation. When alkali metal carboxylate is not present the presence of about 0.01 to about 0.5 pounds of separation agent/pound of solvent, preferably 0.05 to about 0.2 pounds of separation agent/pound of solvent, in the reaction mixture is sufficient to cause the phase separation desired. When alkali metal carboxylate is present, generally a lesser amount of separation agent is necessary to cause phase separation. Preferably, about 0.05 to about 0.15 pounds of separation agent/pound of solvent is then required.

After the phase separation has been accomplished the temperature of the separated phases is lowered from the range in which the poly(arylene sulfide) is molten into the range in which it solidifies. In general, PPS mixtures have a transition temperature of 278° C.±6° C. depending on impurities. Described in another way, the temperature of the molten poly(arylene sulfide) is then decreased from the range of about 260° to about 315° C. to a temperature below about 220° C., preferably within the range of about 100° to about 200° C. The lowering of the temperature after the phase separation of the molten poly(arylene sulfide) causes the arylene sulfide polymer to form into relatively large, coarse particles of about 0.04 to about 4 mm, preferably about 0.1 to about 2 mm size range, as a slurry of particulate poly(arylene sulfide) in polar organic solvent.

Treatment of the slurry comprising particulate poly(arylene sulfide) and poly(arylene sulfide) oligomers which is formed as a result of the "water quench" process to recover the particulate poly(arylene sulfide) can be done by conventional methods. For example, the slurry can be filtered on a wire mesh screen which retains the particulate poly(arylene sulfide) but passes liquid comprising the polar organic solvent and poly(arylene sulfide) oligomers dispersed therein as a filtrate. Alternatively, the slurry from the "water quench" process can be subjected to heat under reduced pressure to evaporate substantially all of the polar organic solvent and any water present to leave a solid residue comprising particulate poly(arylene sulfide), poly(arylene sulfide) oligomers and alkali metal halide. The solid residue can be reslurried in a liquid, preferably water, to provide a second slurry comprising particulate poly(arylene sulfide) and poly(arylene sulfide) oligomers in the liquid. The particulate poly(arylene sulfide) which can be separated as before can be washed further with water if desired and dried to provide useful polymer. The filtrate or dispersion comprising poly(arylene sulfide) oligomers can then be subjected to a final filtration step which recovers the poly(arylene sulfide) oligomers therefrom. This final filtration will generally employ a filtration means capable of retaining particles of at least about one micron in diameter on the filter. If desired, the separated oligomers can be washed at least once to enhance the purity thereof before conventional drying and further processing.

EXAMPLES

Examples are provided in an effort to assist one skilled in the art to a further understanding of the invention, and yet not be unduly limitative of the reasonable scope of the invention. The particular reactants, conditions, ratios, and the like, are all intended to be illustrative of our invention, and not limitative of the reasonable and suitable scope thereof.

EXAMPLE I

A series of polymerization runs was carried out for the preparation of poly(phenylene sulfide) (PPS) employing the reaction mixture recipe shown below.

|  | Compound, g (g-mole) |
|---|---|
| N—Methyl-2-pyrrolidome (NMP) | 1,643 (16.6) |
| Sodium bisulfide[a] (NaSH) | 336.4 (6.00) |
| Sodium hydroxide pellets (NaOH) | variable |
| Sodium acetate (NaOAc) | 147.6 (1.80) |
| p-Dichlorobenzene (DCB) | variable |
| 1,2,4-Trichlorobenzene (TCB) | 1.41 (0.0078) |

[a]Charged as an aqueous solution of 58.46 wt. % NaSH. The solution also contained 0.0073 mole NaOH per mole of NaSH.

In these runs a two-gallon autoclave reactor equipped with temperature and pressure measuring means, stirring means, external heating means and internal cooling means was charged with the aqueous NaSH, NaOH pellets, NaOAc, and NMP. The reactor was purged with nitrogen and heated to 160° C. with stirring at 250 rpm. Water with some NMP was then distilled from the mixture in a dehydration step. About 350 mL of water plus NMP was removed while the temperature increased to 200° C. The DCB and TCB were charged to the reactor in 325 mL NMP. Reactor temperature was raised to 235° C. and held for two hours then raised to 265° C. and held for three hours. Hot water (250 mL) was added slowly during the final portion (about 15 minutes) of the 3 hour reaction period while increasing the stirrer speed to 500–750 rpm during the water addition. The reaction mixture then was allowed to cool slowly overnight to ambient temperature using air as the cooling medium.

The reactor was charged with 2,250 mL deionized water and stirred for 10 minutes at 250 rpm. The resulting slurry was transferred from the reactor to a 3 gallon container and diluted with 2 gallons of water. The diluted slurry which comprised particulate PPS and PPS oligomers ("slime") was then screened on a 200-mesh (74 micron opening) screened metal screen to separate the particulate PPS retained on the screen from the filtrate comprising the PPS oligomers. The filtrate, after standing for a brief period, was decanted to leave a residual volume of 1 gallon which was then poured onto a large Buchner funnel having Whatman No. 1 filter paper thereon. The suction flask holding the funnel was attached to house vacuum (about 25 inches Hg). Observations were then made on the time required to complete filtration of the 1 gallon to recover PPS oligomers therefrom. The results obtained in this series of runs are presented in Table I below.

TABLE I

| Run No. | g Mole NaOH | g Mole DCB | Molar Ratio[e] NaOH/NaSH | Molar Ratio[e] DCB/NaSH | PPS Melt Flow, g/10 min. | Oligomer Filtration Time, hr. |
|---|---|---|---|---|---|---|
| 1[b] | 6.35 | 6.21 | 1.065/1 | 1.035/1 | 43 | ~5 (slow) |
| 2[b,d] | 6.35 | 6.09 | 1.065/1 | 1.015/1 | 83 | ~6 (slow) |
| 3[b] | 6.60 | 6.21 | 1.107/1 | 1.035/1 | 48 | ~8 (very slow) |
| 4[c] | 6.00 | 6.21 | 1.007/1 | 1.035/1 | 172 | ~1 (very fast) |
| 5[c] | 6.18 | 6.21 | 1.037/1 | 1.035/1 | 80 | ~3 (medium) |
| 6[c] | 6.00 | 6.12 | 1.007/1 | 1.020/1 | 113 | ~0.75 (very fast) |

[a]Values for the dried particulate PPS fraction determined according to a modified ASTM D1238 - Procedure B method employing an orifice of 0.0825 ± 0.002 inch diameter and 0.315 ± 0.001 inch length and an effective weight of 5.0 kg including the weight of piston, at 316° C.
[b]Control run.
[c]Invention run.
[d]This run differed in that a one hour reaction period was employed at 235° C. then one hour at 265° C. and finally one hour at 282° C. The reactor was then cooled with air to 265° C. before addition of the 250 mL water.
[e]Before dehydration step.

The results shown in Table I, comparing Runs 4, 5 and 6 with Runs 1, 2 and 3, demonstrate that filtration time for the filtrate sample containing PPS oligomers can be greatly reduced, i.e. filtration rate greatly increased, by utilizing a reduced NaOH/NaSH molar ratio in the polymerization recipe, e.g. less than about 1.065/1.

EXAMPLE II

Other polymerization runs were conducted in a two gallon reactor for the preparation of poly(phenylene sulfide) (PPS). These runs employed a polymerization reaction recipe and reaction sequence substantially the same as that shown for Example I above. However, the amount of DCB was kept constant in these runs at a molar ratio of DCB to NaSH of 1.035/1 while the amount of NaOH was again varied.

In these runs results were obtained on particulate PPS yield and on the yield of recovered PPS oligomers ("slime"). The recovery procedure in these runs was as follows:

(1) transferred polymerization reaction mixture (quenched and thereafter diluted with 2250 mL water) to a three gallon container;

(2) diluted the reaction mixture further with 2 gallons of H2O;

(3) filtered the particulate PPS from the reaction mixture on a 200 mesh (74 micron opening) metal screen;

(4) particulate PPS retained on the screen was reslurried in 2 gallons of water;

(5) reslurried particulate PPS was again filtered on the 200 mesh metal screen with the liquid phase (filtrate) being added to the filtrate obtained in step (3) above;

(6) particulate PPS was washed on the screen with 2 gallons of H2O;

(7) particulate PPS was dried at 125° C. for four hours and submitted for analysis of ash and volatiles content;

(8) filtrate comprising PPS oligomers was washed several times by decanting liquid from the settled PPS oligomers, adding fresh H2O and allowing to stand for a period;

(9) PPS oligomers were then recovered by filtration on a Buchner funnel employing Whatman No. 1 filter paper;

(10) recovered PPS oligomers were dried at 125° C. for four hours and submitted for analysis of ash and volatiles content. In these runs no data was obtained on PPS oligomer filtration rate. The results obtained from these runs are presented in Table II below.

TABLE II

| Run No. | Molar Ratio NaOH/NaSH[d] | Particulate PPS Yield, %[a] | PPS Oligomer Yield, %[a] |
|---|---|---|---|
| 7[b] | 1.10/1 | 90 | 8.0 |
| 8[b] | 1.06/1 | 90.3 | 7.8 |
| 9[b] | 1.06/1 | 90.0 | 8.0 |
| 10[c] | 1.03/1 | 94.0 | 4.1 |
| 11[c] | 1.015/1 | 90 | 7.5 |
| 12[c] | 1.00/1 | 93.5 | 3.5 |

[a]Calculated yield based on dried product on an ash-free and volatile-free basis. Expressed as % of theoretical yield of PPS polymer.
[b]Control run.
[c]Invention run.
[d]Before dehydration step.

The results in TABLE II for Runs 10, 11 and 12 demonstrate that when the NaOH/NaSH molar ratio is 1.03/1 and lower the yield of particulate PPS is generally increased and the yield of PPS oligomer is concomitantly reduced compared to the use of NaOH/NaSH molar ratios of 1.06/1 and higher (Runs 7, 8 and 9).

EXAMPLE III

Further polymerization runs were conducted in a two gallon reactor for the preparation of PPS using substantially the same polymerization reaction recipe and reaction sequence employed in Example I. In these runs the molar ratios of NaOH/NaSH and DCB/NaSH were varied. Results were obtained for particulate PPS yield in the manner described in Example II while filtration rate results for the filtrate comprising the PPS oligomers were obtained in the manner described in Example I. Results obtained in these runs are shown in TABLE III below.

TABLE III

| Run No. | Molar Ratio[c] NaOH/NaSH | Molar Ratio[c] DCB/NaSH | Particulate PPS Yield, % | PPS Oligomer Filtration Rate, gal/hr |
|---|---|---|---|---|
| 13[a] | 1.10/1 | 1.035/1 | 86 | 0.083 |
| 14[a] | 1.06/1 | 1.035/1 | 90 | 0.125 |
| 15[b] | 1.015/1 | 1.025/1 | 92 | 0.86 |
| 16[b] | 1.015/1 | 1.015/1 | 93 | 1.20 |
| 17[b] | 1.015/1 | 1.005/1 | 90 | 3.0 |
| 18[b] | 1.00/1 | 1.010/1 | 93 | 4.0 |

[a]Control run.
[b]Invention run.
[c]Before dehydration step.

The results in TABLE III for Runs 15–18 compared with Runs 13 and 14 again demonstrate greatly improved PPS oligomer filtration rates at the lower molar ratios of NaOH/NaSH. There is also seen again the trend toward increased yield of particulate PPS when the lower NaOH/NaSH molar ratios are employed.

EXAMPLE IV

Further polymerization runs were conducted according to this invention in a two gallon reactor as described in Example I and employing a reaction mixture recipe similar to that shown in Example I except that the NaOH/NaSH molar ratio was held constant at 1.00/1 and the sodium acetate was increased to 2.16 g-mole per 6.00 g-mole NaSH. The DCB/NaSH molar ratio was varied in this series of runs and a control run (Run 19) was also included as shown in TABLE IV below. Results were obtained on the % yield of particulate PPS and PPS oligomers as well as the filtration rate for the PPS oligomers. Melt flow values were also determined on the particulate PPS products.

TABLE IV

| Run No. | Molar Ratio DCB/NaSH[d] | Melt Flow g/10 min.[a] | % Yield PPS Particulate | % Yield PPS Oligomer | PPS Oligomer Filtration Rate, gal./hr. |
|---|---|---|---|---|---|
| 19[b] | 1.035/1 | 81 | 92.0 | 5.3 | 0.20 |
| 20 | 1.020/1 | 157 | 95.5 | 2.5 | 8.6 |
| 21 | 1.015/1 | 103 | 94.5 | 3.0 | —[c] |
| 22 | 1.015/1 | 44 | 93.7 | 3.6 | 4.0 |
| 23 | 1.015/1 | 38 | —[c] | —[c] | —[c] |
| 24 | 1.015/1 | 66 | 94.5 | 3.0 | 3.0 |
| 25 | 1.015/1 | 48 | 93.7 | 3.1 | 1.5 |
| 26 | 1.010/1 | 173 | 92.0 | 3.6 | —[c] |

[a]See footnote [a] TABLE I, Example I.
[b]Control run employing a molar ratio of NaOH/NaSH of 1.06/1 and 1.8 g-mole NaOAc per 6.00 g-mole NaSH.
[c]Not determined.
[d]Before dehydration step.

The results in TABLE IV for the invention runs (Runs 20–26) again show greatly increased PPS oligomer filtration rates as well as reduced yield of PPS oligomer when compared with the control run (Run 19). There is also observed an increase in particulate PPS yield for the invention runs (except Run 26) when compared with the control run (Run 19). Runs 21–25 are duplicate runs and though the melt flow values range from 103 to 38 g/10 min., the % yield values are very consistent and the PPS oligomer filtration rates while ranging from 4.0 to 1.5 gal./min. are still at least 7.5 times that shown for the control run (Run 19).

EXAMPLE V

Several polymerization runs were conducted in a large reaction vessel (90 gallon) for the preparation of PPS according to the method of this invention. Control runs for comparison purposes were also made in the same reactor. The reaction mixture recipe employed reactants to produce theoretically 100 lb of PPS in each batch run. NMP was employed in each run at a level of 35.7 gal. (305.2 lb, 3.079 lb-moles). The reactant charges for the runs are presented in TABLE V below.

TABLE V

| Run No. | lb-moles charged | | | | | After Dehydration Mole % Excess NaOH |
|---|---|---|---|---|---|---|
| | NaOH | NaSH | NaOAc | DCB | TCB | |
| 27 | 0.9242 | 0.9242 | 0.2866 | 0.9291 | 0.00186 | 5.4 |
| 28 | 0.9242 | 0.9242 | 0.2866 | 0.9291 | 0 | 6.3 |
| 29 | 0.8999 | 0.9242 | 0.3110 | 0.9279 | 0.00186 | 5.0 |
| 30 | 0.8999 | 0.9242 | 0.3110 | 0.9238 | 0.00186 | 2.7 |
| 31 | 0.8744 | 0.9242 | 0.3415 | 0.9191 | 0.00186 | 1.6 |
| 32 | 0.8744 | 0.9242 | 0.3415 | 0.9191 | 0.00186 | 1.3 |

As shown in the last column of TABLE V the dehydration step caused a loss of available reactive sulfur species effectively increasing the molar ratio of NaOH to NaSH in the dehydrated mixture. The extent of sulfur species loss was determined directly by a titration of a sample of the dehydrated mixture in aqueous medium with standardized HCl (1N). Two end points were detected with the first indicating the NaOH content while the second indicated the NaSH content. The molar ratio of NaOH/NaSH was determined directly from the following relation: mL titrant to first end point÷(mL titrant to second end point−mL titrant to first end point). TABLE VI presents several reactant molar ratios for Runs.

TABLE VI

| Run No. | Molar Ratios | | | |
|---|---|---|---|---|
| | NaOH/NaSH[a] | NaOH/NaSH[b] | DCB/NaSH[a] | NaOAc/NaSH[a] |
| 27 | 1.000/1 | 1.054/1 | 1.007/1 | 0.311/1 |
| 28 | 1.000/1 | 1.063/1 | 1.003/1 | 0.311/1 |
| 29 | 0.974/1 | 1.050/1 | 1.010/1 | 0.337/1 |
| 30 | 0.974/1 | 1.027/1 | 0.998/1 | 0.337/1 |
| 31 | 0.946/1 | 1.016/1 | 0.996/1 | 0.370/1 |
| 32 | 0.946/1 | 1.013/1 | 0.996/1 | 0.370/1 |

[a]Before dehydration step.
[b]After dehydration step.

In each of the above runs, two 1-gallon samples of the water quenched and cooled (below 125° C.) reaction mixture were taken. One sample was used to determine PPS oligomer filtration rate in the manner described in Example I while the other sample was used to obtain yield results (ash-free basis) for particulate PPS and PPS oligomers in the manner of Example II. The results obtained in these runs are presented in TABLE VII below.

TABLE VII

| Run No. | Molar Ratio NaOH/NaSH | PPS Yield, lb | | PPS Oligomer Filtration Rate, gal/hr |
|---|---|---|---|---|
| | | Particulate | Oligomer | |
| 27[a] | 1.054/1 | 80.50 | 12.00 | 0.50 |
| 28[a] | 1.063/1 | 79.90 | 12.50 | 0.30 |
| 29[b] | 1.050/1 | 81.00 | 11.00 | 1.20 |
| 30[b] | 1.027/1 | 83.60 | 9.50 | 2.00 |
| 31[b] | 1.016/1 | 83.50 | 8.90 | 3.00 |
| 32[b] | 1.013/1 | 84.00 | 8.60 | 4.00 |

[a]Control run.
[b]Invention run.

The results presented in TABLE VII, comparing Runs 29–32 with Runs 27 and 28, demonstrate that NaOH/NaSH molar ratios of 1.050/1 and lower show increased particulate PPS yield and reduced PPS oligomer yield while at the same time significantly increasing the PPS oligomer filtration rate.

That which is claimed is:

1. A method for recovering poly(arylene sulfide) oligomers comprising the steps:
   (a) dehydrating an aqueous admixture of alkali metal hydroxide and alkali metal bisulfide in a polar organic solvent wherein the molar ratio of alkali metal hydroxide to alkali metal bisulfide is about 0.90:1 to about 1.05:1 thereby forming a dehydrated admixture wherein said molar ratio is 0.99:1 to about 1.05:1;
   (b) admixing at least one polyhalo-substituted aromatic compound with said dehydrated admixture to form a polymerization reactant mixture;
   (c) subjecting said reactant mixture to polymerization conditions effective to produce a polymerization reaction mixture comprising poly(arylene sulfide);
   (d) admixing said polymerization reaction mixture at a temperature above that at which said poly(arylene sulfide) is in a molten phase with a sufficient amount of a separation agent characterized as substantially soluble in said polar organic solvent and a non-solvent for said poly(arylene sulfide) to effect a phase separation of said molten poly(arylene sulfide) from said polar organic solvent;
   (e) cooling said polymerization reaction mixture from step (d) to produce a slurry comprising particulate poly(arylene sulfide) and poly(arylene sulfide) oligomers in said polar organic solvent;
   (f) treating said slurry to recover particulate poly(arylene sulfide) therefrom and produce a dispersion of poly(arylene sulfide) oligomers in said polar organic solvent; and
   (g) filtering said dispersion of poly(arylene sulfide) oligomers from step (f) to recover said oligomers therefrom.

2. A method according to claim 1 wherein the molar ratio of alkali metal hydroxide to alkali metal bisulfide is about 0.90:1 to about 1.03:1 in the aqueous admixture before dehydration and 0.99:1 to about 1.03:1 after dehydration.

3. A method according to claim 2 wherein said alkali metal hydroxide is sodium hydroxide and said alkali metal bisulfide is sodium bisulfide.

4. A method according to claim 1 wherein said polyhalo-substituted aromatic compound comprises a p-dihalobenzene.

5. A method according to claim 4 wherein said p-dihalobenzene is p-dichlorobenzene and said polar organic solvent is N-methyl-2-pyrrolidone.

6. A method according to claim 4 wherein said polyhalo-substituted aromatic compound comprises a mixture of p-dihalobenzene and at least one polyhalo aromatic compound having 3 to 6 halogen substituents per molecule.

7. A method according to claim 6 wherein said p-dihalobenzene is p-dichlorobenzene, said polyhalo aromatic compound is 1,2,4-trichlorobenzene and said polar organic solvent is N-methyl-2-pyrrolidone.

8. A method according to claim 7 further employing an alkali metal carboxylate in said polymerization reactant mixture of step (b).

9. A method according to claim 8 wherein said alkali metal carboxylate is sodium acetate and said separation agent is water.

10. A method for recovering poly(arylene sulfide) oligomers comprising the steps:
   (a) dehydrating an aqueous admixture of alkali metal hydroxide and alkali metal bisulfide in a polar organic solvent, employing a molar ratio of alkali metal hydroxide to alkali metal bisulfide of 0.99/1 to about 1.05:1, thereby producing a dehydrated admixture wherein said molar ratio is 0.99:1 to about 1.05:1,
   (b) admixing at least one polyhalo-substituted aromatic compound with said dehydrated admixture to form a polymerization reactant mixture,
   (c) subjecting said reactant mixture to polymerization conditions effective to produce a polymerization reaction mixture comprising poly(arylene sulfide);
   (d) admixing said polymerization reaction mixture of step (c) at a temperature above that at which said poly(arylene sulfide) is in a molten phase with a sufficient amount of a separation agent that is characterized as substantially soluble in said polar organic solvent and is a non-solvent for said poly(arylene sulfide) to effect a phase separation of said molten poly(arylene sulfide) from said polar organic solvent;

(e) cooling said phase-separated polymerization reaction mixture from step (d) to produce a slurry comprising particulate poly(arylene sulfide) and poly(arylene sulfide) oligomers in a liquid comprising said polar organic solvent and separation agent;

(f) recovering said particulate poly(arylene sulfide) from said slurry produced in step (g) to provide a mixture comprising said poly(arylene sulfide) oligomers, said separation agent and said polar organic solvent; and (g) filtering said mixture obtained in step (f) to recover said poly(arylene sulfide) oligomers therefrom.

11. A method according to claim 10 wherein the molar ratio of alkali metal hydroxide to alkali metal bisulfide is about 0.90:1 to about 1.03:1 in the aqueous admixture before dehydration and 0.99:1 to about 1.03:1 after dehydration.

12. A method according to claim 11 wherein said alkali metal hydroxide is sodium hydroxide and said alkali metal bisulfide is sodium bisulfide.

13. A method according to claim 10 wherein said polyhalo-substituted aromatic compound comprises a p-dihalobenzene.

14. A method according to claim 13 wherein said p-dihalobenzene is p-dichlorobenzene and said polar organic solvent is N-methyl-2-pyrrolidone.

15. A method according to claim 12 wherein said polyhalo-substituted aromatic compound comprises a mixture of p-dihalobenzene and at least one polyhalo aromatic compound having 3 to 6 halogen substituents per molecule.

16. A method according to claim 15 wherein said p-dihalobenzene is p-dichlorobenzene, said polyhalo aromatic compound is 1,2,4-trichlorobenzene and said polar organic solvent is N-methyl-2-pyrrolidone.

17. A method according to claim 16 wherein said separation agent is water.

18. A method for recovering poly(arylene sulfide) oligomers comprising the steps:

(a) dehydrating an admixture of aqueous alkali metal hydroxide and aqueous alkali metal bisulfide in a polar organic solvent employing a molar ratio of alkali metal hydroxide to alkali metal bisulfide of about 0.90:1 to about 1.05:1, thereby preparing a dehydrated admixture wherein said molar ratio is 0.99:1 to about 1.05:1;

(b) admixing at least one polyhalo-substituted aromatic compound with said dehydrated admixture to form a polymerization reactant mixture;

(c) subjecting said reactant mixture to polymerization conditions sufficient to produce a polymerization reaction mixture comprising poly(arylene sulfide);

(d) admixing said polymerization reaction mixture at a temperature above that at which said poly(arylene sulfide) is in a molten phase with a sufficient amount of a separation agent that is characterized as substantially soluble in said polar organic solvent and is a non-solvent for said poly(arylene sulfide) to effect a phase separation of said molten poly(arylene sulfide) from said polar organic solvent;

(e) cooling said polymerization reaction mixture from step (d) to produce a slurry comprising particulate poly(arylene sulfide) and poly(arylene sulfide) oligomers in said polar organic solvent;

(f) heating said slurry under pressure conditions sufficient to evaporate polar organic solvent, separation agent soluble in said polar organic solvent, and volatile impurities at a temperature below the normal boiling point of said polar organic solvent, thereby producing a dried mixture comprising poly(arylene sulfide), poly(arylene sulfide) oligomers, and alkali metal halide;

(g) reslurrying said dried mixture with water to extract said alkali metal halide and disperse said poly(arylene sulfide) oligomers in a reslurried mixture;

(h) separating particulate poly(arylene sulfide) from said reslurried mixture, leaving a filtrate comprising poly(arylene sulfide) oligomers and aqueous alkali metal halide solution and (i) filtering said filtrate of step (h) to recover poly(arylene sulfide) oligomers therefrom.

19. A method according to claim 18 wherein the molar ratio of alkali metal hydroxide to alkali metal bisulfide is about 0.90:1 to about 1.03:1 in the aqueous admixture before dehydration and 0.99:1 to about 1.03:1 after dehydration.

20. A method according to claim 19 wherein said alkali metal hydroxide is sodium hydroxide and said alkali metal bisulfide is sodium bisulfide.

21. A method according to claim 18 wherein said polyhalo-substituted aromatic compound comprises a p-dihalobenzene.

22. A method according to claim 21 wherein said p-dihalobenzene is p-dichlorobenzene and said polar organic solvent is N-methyl-2-pyrrolidone.

23. A method according to claim 20 wherein said polyhalo-substituted aromatic compound comprises a mixture of p-dihalobenzene and at least one polyhalo aromatic compound having from 3 to 6 halogen substituents per molecule.

24. A method according to claim 23 wherein said p-dihalobenzene is p-dichlorobenzene and said polyhalo aromatic compound is 1,2,4-trichlorobenzene and said polar organic solvent is N-methyl-2-pyrrolidone.

* * * * *

UNITED STATES PATENT AND TRADEMARK OFFICE
CERTIFICATE OF CORRECTION

PATENT NO. : 4,730,034

DATED : March 8, 1988

INVENTOR(S) : Afif M. Nesheiwat et al

It is certified that error appears in the above-identified patent and that said Letters Patent is hereby corrected as shown below:

Column 12, line 56 delete "0.99/1" and insert therefor --about 0.90:1--.

Signed and Sealed this

Twentieth Day of September, 1988

Attest:

DONALD J. QUIGG

Attesting Officer

Commissioner of Patents and Trademarks